(12) United States Patent
Miller, II et al.

(10) Patent No.: US 7,363,360 B2
(45) Date of Patent: Apr. 22, 2008

(54) SYSTEM AND METHOD FOR MANAGING ELEMENTS OF A COMMUNICATION NETWORK

(75) Inventors: Robert L. Miller, II, Madison, AL (US); Steven A. Bailey, Huntsville, AL (US); Kent E. Darzi, Harvest, AL (US)

(73) Assignee: Adiran, Inc., Huntsville, AL (US)

( * ) Notice: Subject to any disclaimer, the term of this patent is extended or adjusted under 35 U.S.C. 154(b) by 634 days.

(21) Appl. No.: 10/068,313

(22) Filed: Feb. 6, 2002

(65) Prior Publication Data

US 2003/0149754 A1 Aug. 7, 2003

(51) Int. Cl.
*G06F 15/173* (2006.01)

(52) U.S. Cl. ...................... 709/223; 709/224

(58) Field of Classification Search ............... 709/223, 709/224, 220
See application file for complete search history.

(56) References Cited

U.S. PATENT DOCUMENTS

| | | | |
|---|---|---|---|
| 5,455,853 A | 10/1995 | Cebulka et al. | |
| 5,828,842 A | 10/1998 | Sugauchi et al. | |
| 6,009,431 A | 12/1999 | Anger et al. | |
| 6,122,362 A | 9/2000 | Smith et al. | |
| 6,212,674 B1 | 4/2001 | Suckow | |
| 6,222,847 B1 | 4/2001 | Ball et al. | |
| 6,243,747 B1 | 6/2001 | Lewis et al. | |
| 6,260,062 B1 | 7/2001 | Davis et al. | |
| 6,285,688 B1 | 9/2001 | Henderson et al. | |
| 6,308,205 B1 | 10/2001 | Carcerano et al. | |
| 6,324,577 B1 | 11/2001 | Hirai | |
| 6,330,611 B1 | 12/2001 | Itoh et al. | |
| 6,336,138 B1 | 1/2002 | Caswell et al. | |
| 6,339,587 B1 | 1/2002 | Mishra | |
| 6,363,421 B2* | 3/2002 | Barker et al. | 709/223 |
| 6,487,590 B1* | 11/2002 | Foley et al. | 709/223 |
| 6,560,604 B1 | 5/2003 | Fascenda | |
| 6,615,258 B1 | 9/2003 | Barry et al. | |
| 6,834,303 B1 | 12/2004 | Garg et al. | |
| 6,853,841 B1 | 2/2005 | St. Pierre | |
| 6,868,444 B1 | 3/2005 | Kim et al. | |
| 6,895,431 B1 | 5/2005 | Bero | |
| 2002/0194320 A1* | 12/2002 | Collins et al. | 709/223 |
| 2003/0005099 A1* | 1/2003 | Sven et al. | 709/223 |
| 2003/0101251 A1* | 5/2003 | Low | 709/223 |
| 2003/0208572 A1* | 11/2003 | Shah et al. | 709/223 |

\* cited by examiner

*Primary Examiner*—William Vaughn
*Assistant Examiner*—Joseph Maniwang
(74) *Attorney, Agent, or Firm*—Thomas, Kayden, Horstemeyer & Risley, L.L.P.

(57) ABSTRACT

An element management system (EMS) for monitoring elements of a communication network utilizes a plurality of clients, a plurality of network elements, and an element management system (EMS). The clients and the network elements are interfaced with the EMS. The EMS is configured to track which of the network elements are of interest to the clients and to automatically monitor the network elements based on which of the network elements are determined, by the EMS, to be of interest to the clients. The EMS is further configured to provide the clients with information indicative of the monitored elements. Furthermore, the EMS may be configured to store graphical user interface (GUI) code that can be utilized to provide a GUI for monitoring and/or changing a network element. The EMS may provide the GUI code to the clients on demand and may enable a user to update the GUI code stored at the EMS. Moreover, a single update to the GUI code at the EMS may effectively update the GUI code utilized by any or all of the clients.

13 Claims, 6 Drawing Sheets

SYSTEM AND METHOD FOR MANAGING ELEMENTS OF A COMMUNICATION NETWORK

BACKGROUND OF THE INVENTION

1. Field of the Invention

The present invention generally relates to network management techniques and, in particular, to a network management system and method for efficiently managing network elements that are utilized to transmit and/or process signals within a communication network.

2. Related Art

A conventional communication network, for example, the public switched telephone network (PSTN), often employs a large number of communication network elements for signal processing and routing. For example, when a customer subscribes for digital subscriber line (DSL) service, a network provider connects a communication device of the customer to a DSL network element, such as a DSL card, via a DSL line extending from a field office of the communication network to the customer's premises. The DSL card typically includes circuitry for controlling various attributes (e.g., line speed, error correction settings, etc.) of the DSL line.

Other customers also may subscribe for DSL services or other types of services offered by the network service provider. To provide such services, the network service provider may extend one or more communication connections from the premises of these other customers to the same field office. Various other network elements (e.g., DSL cards, IMA cards, ATMs, etc.) may be employed at the field office for controlling communication across these connections. Each of the aforementioned network elements is often positioned on one or more racks or chassis within the field office. Note that typical communication networks employ a large number of field offices similar to the one described above.

Over time, the configuration of the network elements within the network may need to be changed. For example, certain network elements (e.g., DSL cards) may need to be added as more customers subscribe for DSL service. When a network element is added, it should be initially provisioned based on the desired attributes of the communication line being serviced by the network element. Later, the same network element may be utilized to service a different customer requiring a change to the configuration of the network element. As an example, the new customer may be located a different distance from the field office of the network element, and it may be desirable, therefore, to change the line speed of the communication line serviced by the network element. Note that there are various other reasons why it may be desirable to control or change the configuration of a network element. Such reasons are well known in the art and will not be described in significant detail herein.

The process of monitoring the performance and/or changing the configuration of network elements can be a tedious and time consuming task due, in part, to the large number of network elements usually employed in implementing a conventional network. Previously, a technician would travel to various field offices to monitor and/or change the configurations of various network elements. However, the cost of utilizing such techniques to monitor and control the configurations of network elements increased dramatically as networks rapidly grew to service more customers.

To facilitate the monitoring and controlling of network elements, element management systems have been developed. An element management system (EMS) is essentially a server system that is communicatively coupled to the various network elements employed within a network. The EMS is also coupled to various computer terminals, often referred to as "clients."

Moreover, a user located at a client may submit a request for monitoring the operation of a particular network element. The client communicates the request to the EMS, and in response, the EMS gathers the requested information and provides the requested information to the client. If the user desires to change the configuration of the network element, the user may submit another request that causes the EMS to change the configuration of the network element as desired. Thus, the EMS enables a user to remotely monitor and control various network elements without having to travel to the different field offices where the network elements reside.

In order to enable users to monitor and control network elements, the clients typically include software, such as JAVA, for example, that define graphical user interfaces for controlling the various types of network elements. For example, a first type of network element (e.g., an ADSL card) may control attributes different than the attributes controlled by a second type of network element (e.g., an IMA card). In such a case, software defining a graphical user interface (GUI) suitable for displaying and changing the attributes of the first type of network element and software defining a GUI suitable for displaying and changing the attributes of the second type of network element may be downloaded into the clients. A topology of the network may be displayed via the client, and the user may select one of the network elements of the topology. The GUI associated with the type of selected network element is then displayed and filled with attribute data that is gathered by the EMS and that pertains to the selected network element. Note that a selection of a different type of network element invokes a different GUI suitable for monitoring and controlling attributes for the different type of network element.

Often, it is desirable to update GUIs utilized to monitor and change network element attributes. For example, new types of network elements are often added to the network as new services become available. In order to enable the clients to monitor and control the new types of network interfaces, it is often necessary or desirable to download different types of GUIs into the clients. In another example, it may be desirable to change an existing GUI to accommodate changes to the network elements serviced by the existing GUI. The process of updating the GUIs can be a burdensome and time consuming task. Indeed, even the task of tracking which clients have been suitably updated and which clients need to be updated can be difficult and burdensome, particularly when a large number of clients are employed.

Furthermore, when multiple clients are employed within a network, it is sometimes possible for one client to display an obsolete set of attribute data for one or more network elements. In this regard, after one client has polled a particular network element to discover the element's attributes, another client may change the configuration of the element. Thus, once the change to the element's configuration occurs, the attribute data received by the one client no longer accurately reflects the state of the particular network element. As a result, the one client may indicate an erroneous or obsolete state of the changed element.

In addition, as the number of network elements and/or clients within a network grows, the amount of data communicated by the network's EMS typically increases. This can put a significant communication burden on the EMS and can cause some communication delays.

Thus, while the introduction of EMSs has greatly facilitated the process of monitoring and controlling network elements, current EMSs suffer from various drawbacks that generally decrease the overall efficiency and/or effectiveness of the EMSs.

SUMMARY OF THE INVENTION

Generally, the present invention provides a system and method for managing elements of a communication network.

A system in accordance with one embodiment of the present invention utilizes a plurality of clients, a plurality of network elements, and an element management system (EMS). The clients and the network elements are interfaced with the EMS. The EMS is configured to track which of the network elements are of interest to the clients and to automatically monitor the network elements based on which of the network elements are determined, by the EMS, to be of interest to the clients. The EMS is further configured to provide the clients with information indicative of the monitored elements.

In accordance with another feature of the present invention, an EMS may be configured to store graphical user interface (GUI) code that can be utilized to provide a GUI for monitoring and/or changing a network element. The EMS may provide the GUI code to the clients on demand and may enable a user to update the GUI code stored at the EMS. As a result, a single update to the GUI code at the EMS may effectively update the GUI code utilized by any or all of the clients.

The present invention can also be viewed as providing a method for managing elements of a communication network. The method can be broadly conceptualized by the following steps: tracking which of the network elements are of interest to a plurality of clients; automatically monitoring the network elements based on the tracking step; and providing the clients with information indicative of the monitored elements based on the monitoring step.

Various features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

The present invention generally pertains to an element management system (EMS) for the telecommunication industry. The EMS of the present invention services one or more clients by providing the clients with information pertaining to selected network elements and by enabling the clients to change the configuration of selected network elements. The network elements reside in a communication network (e.g., the public switched telephone network (PSTN), the Internet, etc.) and control various communication attributes of the network.

Figure 1:
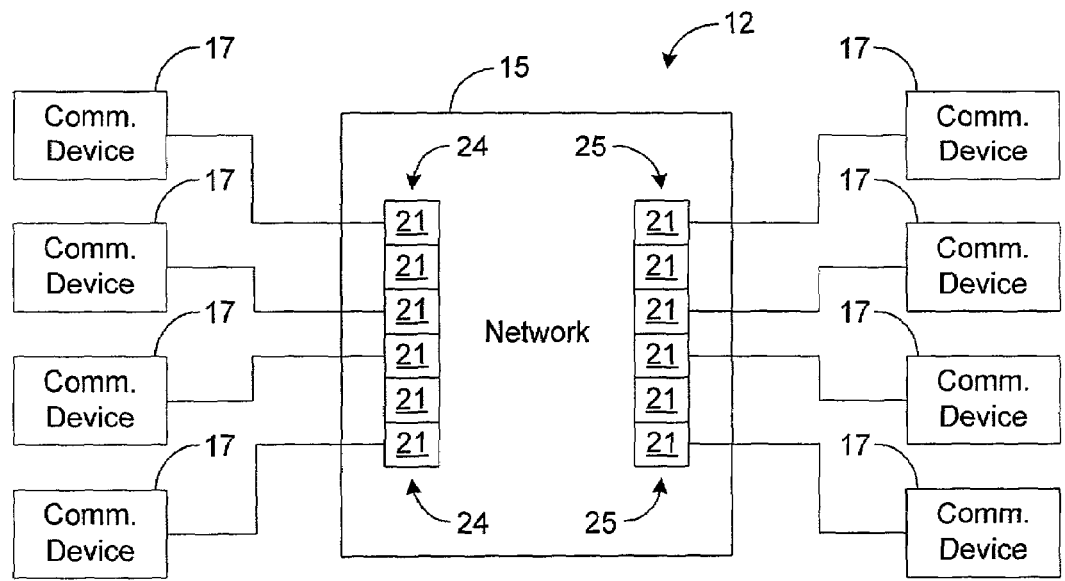
FIG. 1 is a block diagram illustrating a conventional communication system.

FIG. 1 depicts a conventional communication system 12. As shown by FIG. 1, the system 12 includes a communication network 15 that is communicatively coupled to a plurality of communication devices 17. The communication devices 17 may communicate to one another over the network 15 via techniques well known in the art. Each of the communication devices 17 is usually serviced by one or more network elements 21 residing within the network 15. A first set 24 of network elements 21 resides within a first field office and services communication devices 17 located within a close proximity of the first field office. Furthermore, a second set 25 of network elements 21 resides within a second field office and services communication devices 17 located within a close proximity of the second field office. Note that other numbers of field offices, communication devices 17, and network elements 21 are possible. Indeed, most conventional communication networks 15 typically employ millions of network elements 21 thereby enabling communication between millions of communication devices 17.

Figure 2:
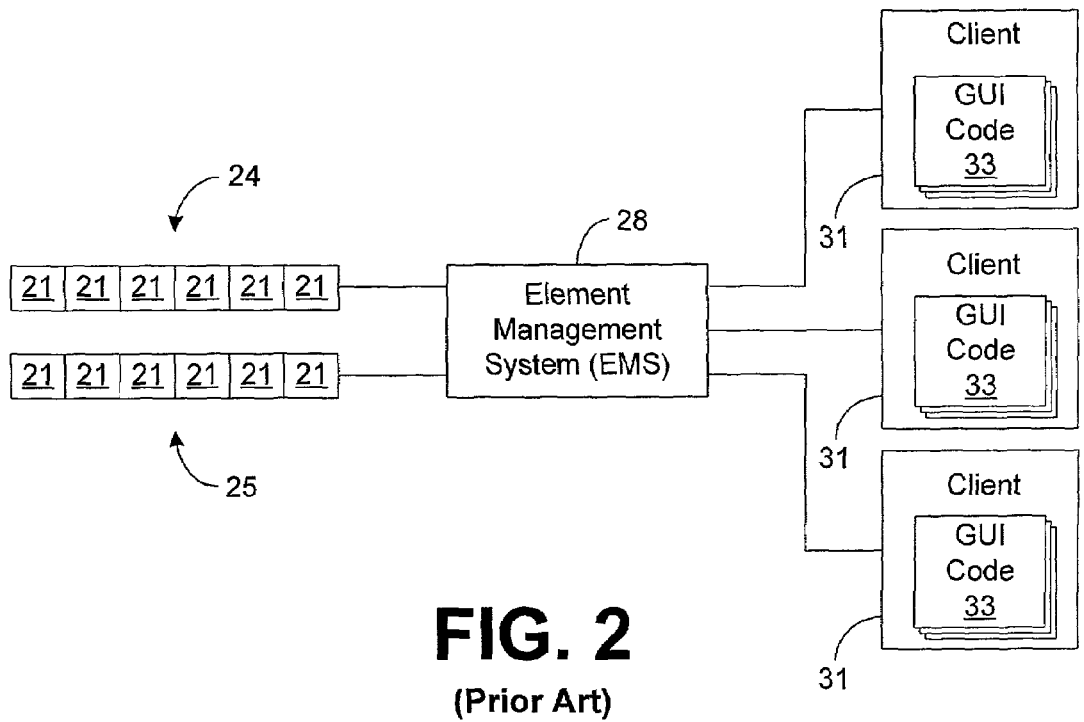
FIG. 2 is a block diagram illustrating a conventional element management system that may be utilized to monitor and/or control network elements depicted in FIG. 1.

An EMS 28 is typically employed to enable efficient monitoring and controlling of the network elements 21. As shown by FIG. 2, the EMS 28 is usually coupled to a plurality of clients 31 that may be located remotely from the EMS 28 and/or the network elements 21. Each client 31 usually includes various sets of graphical user interface (GUI) code 33 for displaying various GUIs to a user of the client 31. Network elements 21 of different types usually monitor and control different communication attributes, and each set of GUI code 33 defines a different GUI, which is usually specifically designed for a certain type of network element 21. For example, a first GUI may be designed for a network element 21 of a first type (e.g., a DSL card), and a second GUI may be designed for a network element 21 of another type (e.g., an IMA card).

Moreover, when the user of a client 31 selects a particular network element 21 for monitoring and/or control, the client 31 invokes the set of GUI code 33 that defines a GUI corresponding to selected element's type. The invoked code 33 displays a GUI compatible with the selected network element 21, and the user, via the displayed GUI, may submit commands for changing the configuration of the selected network element 21, as will be described in more detail hereafter.

Typically, when a set of GUI code 33 is invoked, the invoked set of GUI code 33 not only displays a GUI, as described above, but also, either periodically or on demand, transmits a status request to the EMS 28. The status request identifies the network element 21 selected by the user of the client 31, and in response to the status request, the EMS 28 gathers information pertaining to the status or operation of the selected network element 21. In this regard, the EMS 28 is communicatively coupled to the selected network element 21 and reads the requested information from the selected network interface 21. Communication between the EMS 28 and the network elements 21 is typically achieved via transmission control protocol/internet protocol (TCP/IP) and simple network management protocol (SNMP).

After reading the requested information, the EMS 28 transmits the requested information to the requesting client 31. Note that communication between the EMS 28 and clients 31 is also typically achieved via TCP/IP. The set of GUI code 33 that originally submitted the status request displays the requested data via the GUI displayed by the invoked code 33. Thus, the user of the client 31 is able to determine and monitor the status of the selected network element 21.

At times, the user of the client 31 may desire to change the configuration of the selected network element 21. For example, the user may desire to change the line speed of a communication line being serviced by the selected network element 21. The GUI displayed to the user usually allows the user to submit commands for changing the configuration of the selected network element 21. When such a command is submitted, the GUI code 33 transmits the command to the EMS 28, which then changes the configuration of the selected network element 21 in response to the command from the client 31.

For example, in the case where the user desires to change the line speed of the selected network element 21, the network element 21 may be configured to control its line speed based on a control value stored in a control register (not shown) residing within the network element 21. In this example, the EMS 28 may be configured to overwrite the foregoing control value with a new value based on the command received from the client 31. In other examples, other techniques may be employed by the EMS 28 in servicing other types of configuration change commands received from the clients 31.

The system 12 shown by FIGS. 1 and 2 suffers from a variety of drawbacks. For example, changes in the GUI code 33 of each of the clients 31 may be required to accommodate changes in the network elements 21. The process of updating the GUI code 33 in each of the clients 31 and of tracking the updates made to the GUI code 33 of the different clients 31 can be burdensome and time consuming, particularly as the number of clients 31 increases.

Furthermore, increases in the number of clients 31 generally increase the amount of communication between the EMS 28 and the clients 31. More particularly, more clients 31 may result in a higher number of status requests and/or configuration change commands being communicated to the EMS 28. Moreover, such increased communication between the EMS 28 and the clients 31 increases the EMS's processing burden and may cause undesirable communication delays.

In addition, when a plurality of clients 31 are monitoring the same network element 21, it is possible for some of the clients 31 to display obsolete status information. In this regard, one of the clients 31 may submit a command for changing the configuration of the monitored network element 21. The status information being displayed by the other clients 31 may become obsolete once the configuration change occurs. More specifically, until the status information displayed by the other clients 31 is refreshed, the displayed status information exhibits the state of the network element 21 as it existed before the occurrence of the configuration change. As a result, users of the other clients 31 may be viewing inaccurate or obsolete status information.

Figure 3:
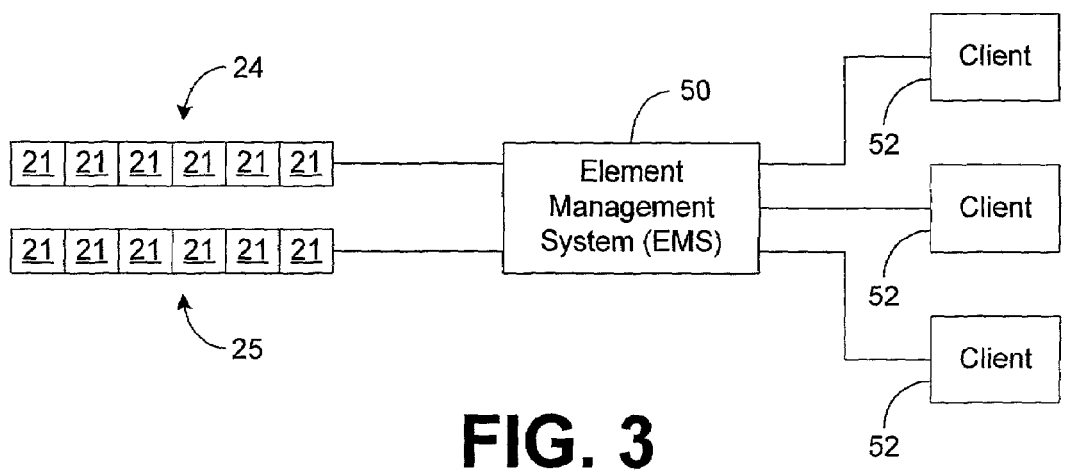
FIG. 3 is a block diagram illustrating an element management system that may be utilized to monitor and/or control network elements depicted in FIG. 1 in accordance with a preferred embodiment of the present invention.
Figure 4:
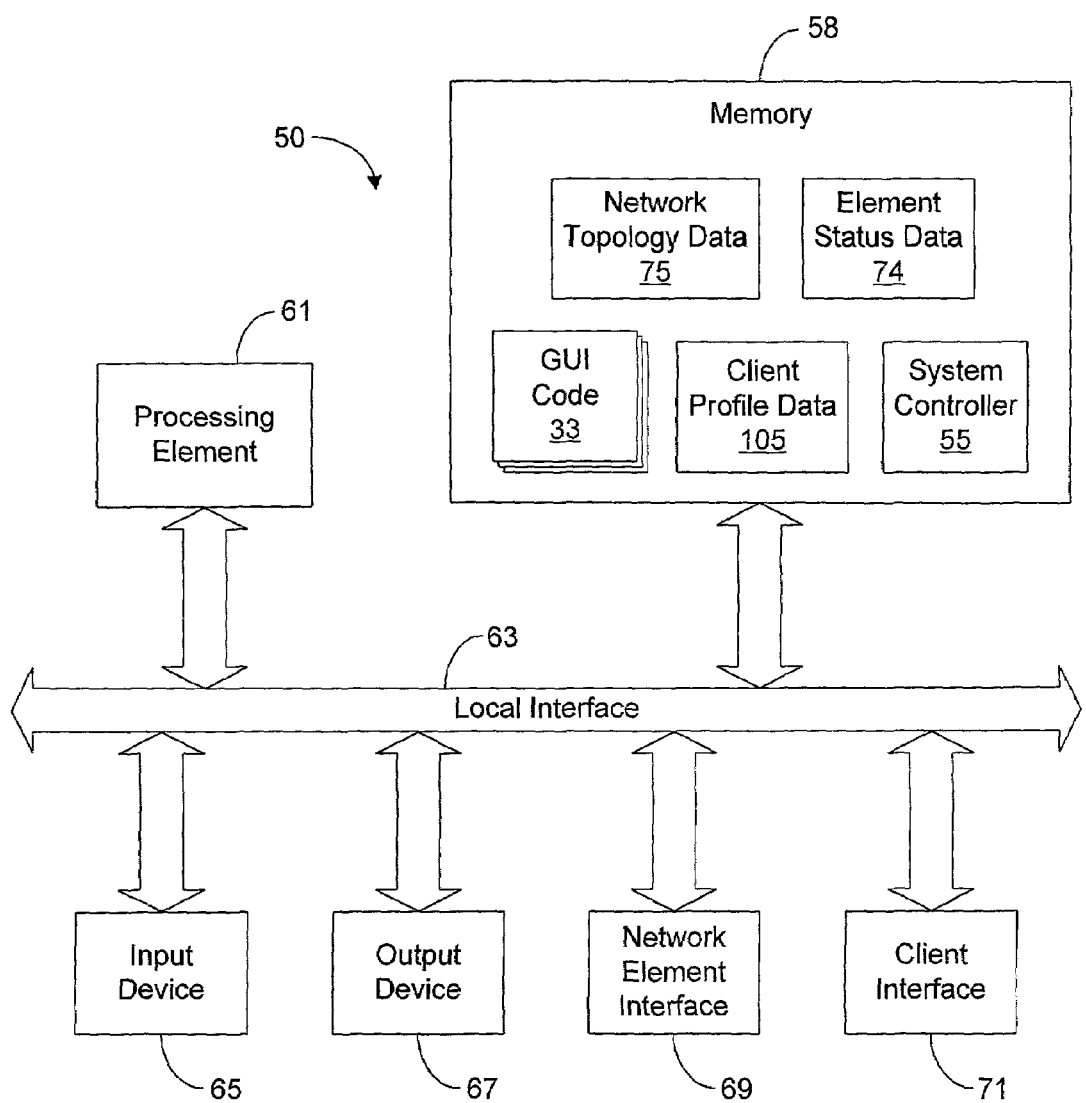
FIG. 4 is a block diagram illustrating a more detailed view of the element management system depicted in FIG. 3.

The present invention overcomes many of the shortcomings and inadequacies discussed hereinabove. An EMS 50 in accordance with a preferred embodiment of the present invention is depicted by FIG. 3. Similar to the conventional EMS 28 of FIG. 2, the EMS 50 of the present invention is communicatively coupled to one or more network elements 21 and one or more clients 52. As shown by FIG. 4, the EMS 50 preferably includes a system controller 55 that controls the operation of the EMS 50, as will be described in more detail hereafter. The system controller 55 can be implemented in software, hardware, or a combination thereof. In the preferred embodiment, as illustrated by way of example in FIG. 4, the system controller 55 of the present invention, along with its associated methodology, is implemented in software and stored in memory 58 of the EMS 50.

Note that the system controller 55, when implemented in software, can be stored and transported on any computer-readable medium for use by or in connection with an instruction execution system, apparatus, or device, such as a computer-based system, processor-containing system, or other system that can fetch and execute instructions. In the context of this document, a "computer-readable medium" can be any means that can contain, store, communicate, propagate, or transport a program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the system controller 55 may be magnetically stored and transported on a conventional portable computer diskette.

The preferred embodiment of the EMS 50 of FIG. 4 comprises one or more conventional processing elements 61, such as a central processing unit (CPU), for example, that communicate to and drive the other elements within the EMS 50 via a local interface 63, which can include one or more buses. Furthermore, an input device 65, for example, a keyboard or a mouse, can be used to input data from a user of the EMS 50, and an output device 67, for example, a screen display or a printer, can be used to output data to the user. The EMS 50 preferably includes a network element interface 69 for communicating with the network elements 21 and a client interface 71 for communicating with the clients 52.

As shown by FIG. 4, various sets of GUI code 33 are maintained within the EMS 50. The GUI code sets, as described hereinabove, define different GUIs for different types of network elements 21. The GUIs allow users to exchange information with the clients 52 for monitoring the status of the network elements 21 and/or changing the configuration of the network elements 21. Also maintained within the EMS 50 is element status data 74 and network topology data 75. The network topology data 74 defines a topology of the network elements 21 and indicates the status of each of the network elements 21. The GUI code 33, the element status data 74, and the network topology data 75 will be described in more detail hereafter.

Figure 5:
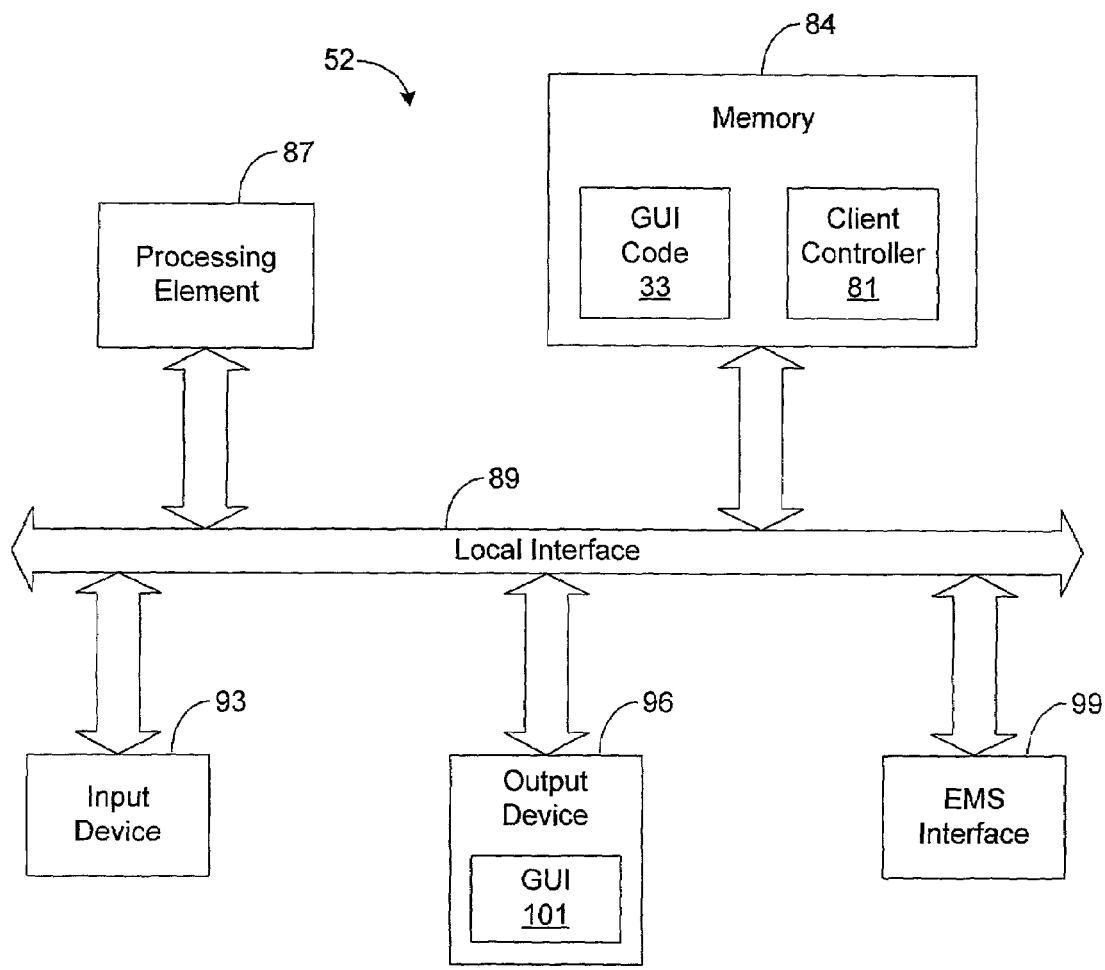
FIG. 5 is a block diagram illustrating a more detailed view of a client depicted in FIG. 3.

As shown by FIG. 5, each of the clients 52 includes a client controller 81 that generally controls the operation of the client 52. The client controller 81 can be implemented in software, hardware, or a combination thereof. In the preferred embodiment, as illustrated by way of example in FIG. 5, the client controller 81, along with its associated methodology, is implemented in software and stored in the client's memory 84. When implemented in software, the client controller 81 can be stored and transported on any computer-readable medium.

The client 52 shown by FIG. 5 also comprises one or more conventional processing elements 87, such as a central processing unit (CPU), for example, that communicate to and drive the other elements within the client 52 via a local interface 89, which can include one or more buses. Furthermore, an input device 93, for example, a keyboard or a mouse, can be used to input data from a user of the client 52, and an output device 96, for example, a screen display, can be used to output data to the user. The client 52 preferably includes an EMS interface 99 for communicating with the EMS 50 (FIG. 3).

When the user of the client 52 desires to monitor the status of a network element 21 and/or to control a configuration of a network element 21, the user, via input device 93, submits an input for establishing a communication session between the client 52 and the EMS 50. In response, the client 52, via EMS interface 99, communicates to the EMS 50 a message indicating that the client 52 is interested in utilizing the services of the EMS 50. The system controller 55 of the EMS 50 then retrieves topology data 75, and the system controller 55 also retrieves a set of GUI code 33 for displaying the topology data 75 and for allowing the user to select one of the network elements 21 within the topology defined by the topology data 75. The EMS 50 communicates the retrieved data to the client 52, which then stores and invokes the received GUI code 33 thereby displaying a topology of the network interfaces 21 to the user via the output device 96.

From the displayed topology, the user selects a network element 21. The GUI code 33 for displaying the topology then communicates, to the EMS 50, a message (referred to hereafter as a "display request") identifying the network element 21 selected by the user. In response, the system controller 55 retrieves the set of GUI code 33 pertaining to the type of selected network element 21, and the system controller 55 retrieves status data 74 indicative of the current operational state of the selected network element 21. The system controller 55, via client interface 71, transmits the retrieved set of GUI code 33 and status data 74 to the client 52.

Upon receiving the GUI code 33, the client 52 stores and invokes the received GUI code 33 such that a GUI 101 associated with the selected network element 21 is displayed to the user via the output device 96. The displayed GUI 101 may include the status data 74 that is indicative of the present state of the selected network element 21 and may include options for changing the configuration of the selected network element 21. Thus, the user can view the GUI 101 to analyze the present state of the selected network element 21, and if desired, the user may select one of the options for changing the state of the selected network element 21.

If the user selects an option to change the configuration of the selected network element 21, the GUI code 33 defining the displayed GUI 101 transmits, via EMS interface 99, a command for changing the selected element's configuration. In response, the system controller 55 changes the configuration of the selected network element 21 as instructed. The system controller 55 also updates the element status data 74, as appropriate, to account for the changed configuration. For example, if the user requested a change to the selected element's line speed, then the system controller 55 updates the data 74 such that it indicates the line speed, as changed by the system controller 55, for the selected network element 21.

Also, the system controller 55 automatically transmits, to each of the other clients 52 interested in the selected element 21, data (referred to hereafter as "element update data") indicative of the configuration change. A client 52 is "interested" in the selected element 21 if the client 52 is presently being used to monitor or analyze the state of the selected element 21. Moreover, each interested client 52 may be displaying information indicative of the status of the selected element 21, and each such client 52 updates this displayed information based on the element update data received from the system controller 55 such that the displayed information accounts for the aforementioned configuration change. Thus, the status information displayed by each client 52 for a particular element 21 is preferably updated, in real-time, when any one of the clients 52 changes the configuration of the particular element 21.

Note that the system controller 55 can be configured to transmit the element update data to each client 52 communicatively coupled to the EMS 50. However, such an embodiment needlessly transmits the element update data to clients 52 that are not presently interested in the changed network element 21. A more efficient approach is to transmit the element update data only to the clients 52 interested in the changed element 21. To enable such an embodiment, the system controller 55 preferably tracks which clients 52 are interested in which network elements 21.

In the preferred embodiment, the system controller 55 tracks the interest of the clients 52 by tracking the use of the GUI code 33, and the system controller 55 preferably maintains client profile data 105 that is indicative of which clients 52 are interested in which elements 21. In this regard, as described above, the system controller 55 is notified, via a "display request," when a user of a client 52 desires to monitor the status of a selected element 21 or to change the configuration of the selected element 21. Upon receiving such a notification from a particular client 52, the system controller 55 preferably updates the client profile data 105 such that the data 105 indicates that the particular client 52 is interested in the selected element 21. Once a user no longer desires to monitor or control the particular element 21, the user can close the GUI 101 being used to monitor and/or control the particular element 21. The closing of the foregoing GUI 101 indicates that the client 52 is no longer interested in receiving status information pertaining to the particular element 21. Moreover, when the user closes the GUI 101, the client 52 preferably notifies the system controller 55 of the EMS 50. In response, the system controller 55 updates the client profile data 105 to indicate that the client 52 is not interested in the particular element 21.

Therefore, when the system controller 55 determines that the configuration or status of a network element 21 has changed, the system controller 55 can consult the client profile data 105 to determine which clients 52 are interested in the change. Based on the client profile data 105, the system controller 55 can then transmit data indicative of the change only to the clients 52 interested in the change. By implementing the foregoing techniques, the integrity of the data displayed by the clients 52 is protected. More specifically, when any one of the clients 21 changes the configuration or state of a network element 21, all of the other clients 52 interested in the changed network element 21 should be immediately and automatically notified.

It should be noted that when a user closes a GUI 101, the client 52 preferably discards the set of GUI code 33 defining the closed GUI 101. Furthermore, each time a new GUI 101 is to be displayed by a client 52, the GUI code 33 defining the new GUI 101 is preferably downloaded to the client 52 from the EMS 50, as described hereinabove. By downloading GUI code 33 on demand in this way, the process of updating the GUI code 33 to accommodate for changes in the network elements 52 is facilitated. In this regard, when a change to a set of GUI code 33 is to be made or when a set of GUI code 33 is to be added, a user can simply update the GUI code 33 residing at the EMS 50. Since the clients 52 request a download of GUI code 33 each time a new GUI 101 is opened, future openings of GUIs 101 by the clients 52 will be based on the updated GUI code 33 residing at the EMS 50. Thus, updating the GUI code 33 at the EMS 50 has the effect of updating the GUI code 33 for all of the clients 52.

Furthermore, as described hereinabove, the system controller 55 may be aware of which clients 52 are interested in which network elements 21. When an update to a set of GUI code 33 at the EMS 50 occurs, the system controller 55 may be configured to transmit the set of updated GUI code 33 to each client 52 that is presently utilizing or running the same set of code 33. The clients 52 that would be utilizing or running the same set of code 33 are the clients 52 interested in a network element 21 of the type associated with the updated code 33. For example, if an update to the set of code 33 defining a GUI for DSL cards occurs at the EMS 50, each client 52 interested in one of the network's DSL cards preferably receives the updated code 33. Moreover, each client 52 receiving the updated code 33 preferably discards its present version of the code 33 (which has yet to be updated) and begins utilizing or running the updated set of code 33 received from the EMS 50. Accordingly, each client 52 utilizing or running a set of code 33 that is updated at the EMS 52 is automatically and immediately notified of the update and enabled to run the updated version of the code 33 in lieu of the obsolete version residing at the client 52.

Note that, by maintaining the GUI code 33 at the EMS 50 and by downloading code 33 from the EMS 50 when a new GUI 101 is to be opened, it is not necessary for a user to manually update each client 52 or to keep track of which clients 52 have received updated code 33. A user simply updates the code 33 at the EMS 50, and the system controller 55 of the EMS 55 automatically provides each client 52 with the updated code 33, as needed, thereby making updates to the code 33 easier and less time consuming.

In the preferred embodiment, the EMS 50 is configured to monitor the status of each network element 21 that is of interest to any of the clients 52. In this regard, the system controller 55 periodically investigates the status of each such network element 21 and updates the element status data 74 when the status of any monitored element 21 changes. Thus, the element status data 74 should reflect the present status of each element 21 of interest to any client 52.

Furthermore, when the system controller 55 detects a change to the status of one of the monitored elements 21, the system controller 55 not only updates the element status data 74, but the system controller 55 also automatically transmits data indicative of the changed status (i.e., element update data) to each client 52 interested in the changed element 21. Each client 52 interested in the changed element 21 may then update its display of the element's status information such that the user of the client 52 views up-to-date status information for the foregoing element 21. In other words, the users of clients 52 are able to see changes in the status of monitored elements 21 in real-time.

By monitoring the status of the elements 21 via the system controller 55 and automatically transmitting element update data to the clients 52 as needed, it is not necessary for the clients 52 to transmit status requests to the EMS 50. Thus, implementing the foregoing techniques helps to reduce the amount of communication that occurs between the clients 52 and the EMS 50. Furthermore, with the conventional EMS 28, if more than one client 31 is interested in the same network element 21, each such client 31 polls the network element 21. However, with the EMS 50 of the preferred embodiment of the present invention, a particular network element 21 is polled only by the system controller 55, even if multiple clients 52 are interested in the particular element 21. Thus, implementing the foregoing techniques also helps to reduce the amount of communication that occurs between the EMS 50 and the network elements 21.

In the preferred embodiment, the system controller 55 is configured to monitor the network elements 21 based on which elements 21 are of interest to any of the clients 52. In this regard, monitoring network elements 21 that are not of interest to any of the clients 52 is unnecessary and wasteful. Thus, the system controller 55 can consult the client profile data 105 and determine which of the network elements 21 are of interest to one or more of the clients 52. The system controller 55 then polls only the network elements 21 that are of interest to one or more clients 52. Note that which network elements 21 are of interest to one or more clients 52 may change over time, and the system controller 55 is preferably configured to detect such changes and to appropriately change which network elements 21 are monitored by the system controller 55.

In addition, as described hereinabove, the system controller 55 detects when a client 52 terminates its interest in a particular network element 21 by detecting when the client 52 closes the GUI 101 that enables the client 52 to monitor the status of the element 21 and/or to control the configuration of the element 21. However, in some instances, a client 52 may fail to inform the system controller 55 when the client 52 closes a GUI 101 and, therefore, when the client's interest in the element 21 associated with the closed GUI 101 terminates. For example, the communication between the client 52 and the system controller 55 may be interrupted before the client 52 is able to transmit a message indicating that the GUI 101 has been closed. Thus, the client profile data 105 may erroneously indicate that a client 52 is interested in a particular element 21 when, in fact, the client 52 is no longer interested in the particular element 21. Accordingly, the system controller 55 may be configured to actively check whether or not clients 52 are still interested in elements 21 being monitored by the system controller 55.

In this regard, to actively check whether any client 52 is interested in a particular network element 21, the system controller 55 may periodically "ping" each client 52 with a message that induces each client 52 interested in the particular network element 21 to reply. If the network controller 55 receives a reply message, then the controller 55 is aware that the particular element 21 is presently of interest to the client 52 that transmitted the reply message. In such a case, the system controller 55 continues to monitor the particular network element 21. However, if the network controller 55 fails to receive a reply message after a reasonable time-out period, then the network controller 55 may determine that no clients 52 are interested in the particular network element 21. In such a case, the system controller 55 preferably terminates its monitoring of the particular network element 21 until the system controller 55 later determines that at least one client 52 has become interested in the particular network element 21. Note that the client profile data 105 may be updated, if desired, based on which clients 52 respond to the "pings" transmitted by the system controller 55.

Figure 6:
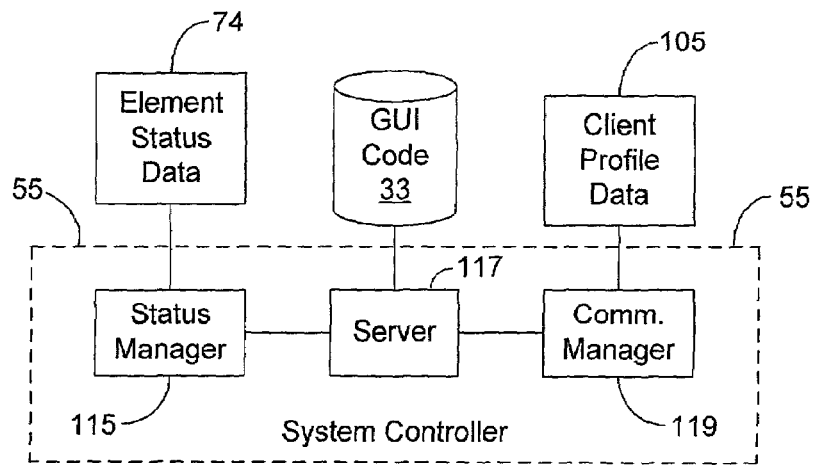
FIG. 6 is a block diagram illustrating a more detailed view of a system controller depicted in FIG. 4.

It should be noted that in the preferred embodiment, as shown by FIG. 6, the system controller 55 is implemented via separate modules: a status manager 115, a server 117, and a communication manager 119. Each of the modules may be separately and concurrently executed via the one or more processing elements 61 (FIG. 4). The status manager 115 is responsible for monitoring the network elements 21 and for updating the element status data 74 based on the status manager's monitoring of the network elements 21. Note that the status manager 115 preferably utilizes TCP/IP and SNMP protocols for communicating with the network elements 21. Furthermore, the status manager 115 detects changes in the status of the monitored elements 21 and informs the server 117 when the status manager 115 detects such a change.

The communication manager 119 is responsible for controlling the communication between the EMS 50 and the clients 52 and for maintaining the client profile data 105. The communication manager 119 preferably utilizes TCP/IP protocol for communicating with the clients 52 and is preferably implemented as a JAVA messaging system (JMS). When data is to be transmitted to one or more clients 52, the server 117 passes a transmit request that includes the foregoing data to the communication manager 119. The communication manager 119 is then responsible for communicating the data to the appropriate clients 52. Furthermore, messages received from the clients 52 are preferably passed to the server 117 by the communication manager 119. Note that messages to be transmitted to the clients 52 may be buffered by the communication manger 119 until such messages can be transmitted by the communication manager 119, and messages received from the clients 52 may be buffered by the communication manager 119 until the server 117 is ready to process the messages.

The server 117 is preferably configured to implement the remainder of the functionality described hereinabove for the system controller 55. In particular, the server 117 is configured to service configuration changes requested by the clients 52 and to provide the appropriate GUI code 33 when a client 52 requests the opening of a new GUI 101. Note that to enable the GUI code 33 to be easily updated by users of the EMS 50, the GUI code 33 may be stored in a database, as shown by FIG. 6. In addition, when the status manager 115 notifies the server 117 of a detected change in the status of a monitored network element 21, the server 117 is configured to submit a transmission request to the communication manager 119, which notifies the interested clients 52 of the change in response to the transmission request.

The configuration of FIG. 6 has the advantage of allocating the burdensome tasks of monitoring the network elements 21, which typically number in the hundreds of thousands or in the millions, and of communicating with the clients 52 to separate modules essentially dedicated for performing the foregoing functions, respectively. Thus, the server 117 is not burdened with the time consuming tasks of managing communication with the elements 21 and the clients 52 and can, therefore, perform the other functionality of the system controller 55 in a timely manner. However, it should be noted that the configuration shown by FIG. 6 is not a necessary feature of the present invention, and other configurations of the system controller 55 are possible without departing from the principles of the present invention.

It should be noted that the present invention has been described as utilizing a GUI 101 to interface data with a user of a client 52. However, utilization of GUIs 101 and GUI code 33 is not a necessary feature. In this regard, other known data interfacing techniques and mechanisms may be employed to interface data with the users of the clients 52.

Operation

The preferred use and operation of the EMS 50 and associated methodology are described hereafter.

For illustrative purposes, assume that a user would like to view the status of a particular network element 21. The user, via the input device 93 of one of the clients 52, referred to hereafter as "user client 52," submits one or more inputs identifying the particular element 21 of interest. In response, the client 52 transmits a display request identifying the particular element 21 to the EMS 50. The communication manager 119 (FIG. 6) receives the request and updates the client profile data 105 to indicate that the user client 52 is interested in the particular network element 21, as shown by blocks 131 and 133 of FIG. 7. The communication manager 119 then notifies the server 117 of the display request, as shown by block 135.

Figure 8:
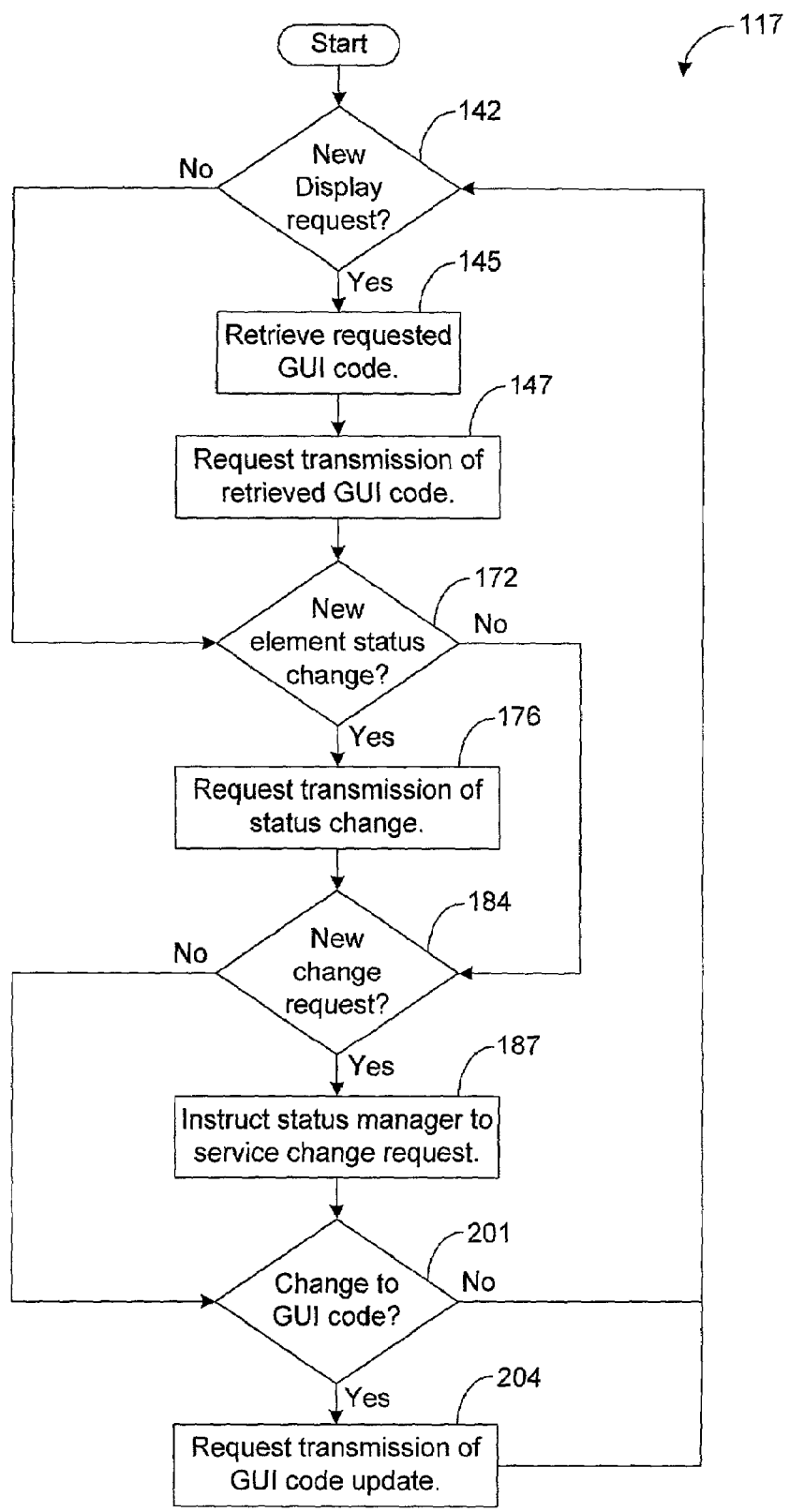
FIG. 8 is a flow chart illustrating a preferred architecture and functionality of a server depicted in FIG. 6.

In response, the server 117 retrieves the set of GUI code 33 that is associated with the particular element's type, as shown by blocks 142 and 145 of FIG. 8. In block 145, the server 117 also retrieves status data 74 indicative of the current status of the particular element 21. The server 117 then includes the retrieved data in a transmission request and passes the transmission request to the communication manager 119 in block 147.

Figure 7:
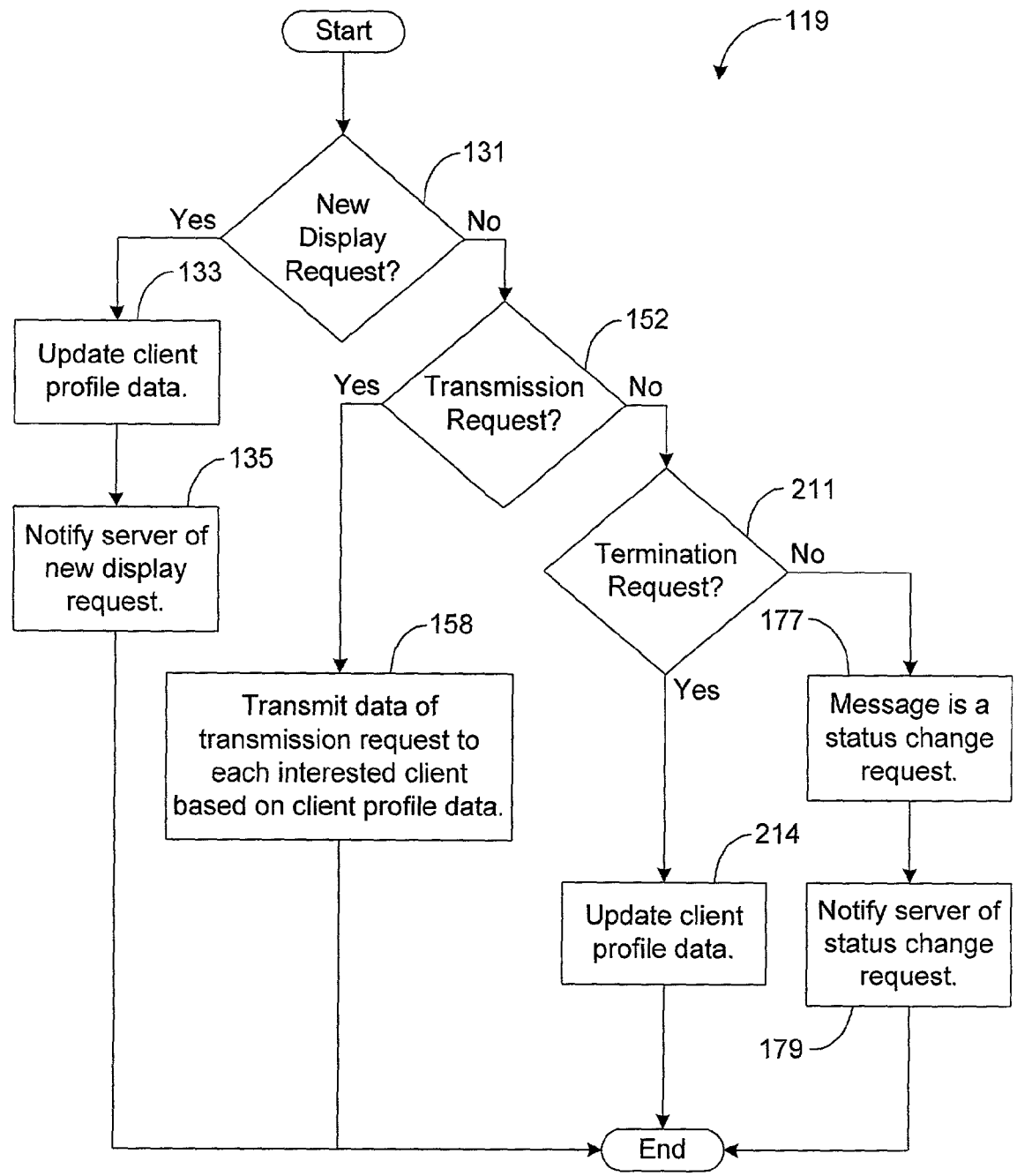
FIG. 7 is a flow chart illustrating a preferred architecture and functionality of a communication manager depicted in FIG. 6 for each message received by the communication manager.

In response, the communication manager 119, as shown by blocks 152 and 158 of FIG. 7, communicates the retrieved GUI code 33 and status data 74 to the user client 52, which displays a GUI 101 based on the GUI code 33. The displayed GUI 101, which will be referred to hereafter as the "original GUI 101," may include the status data 74 transmitted along with the GUI code 33.

Figure 9:
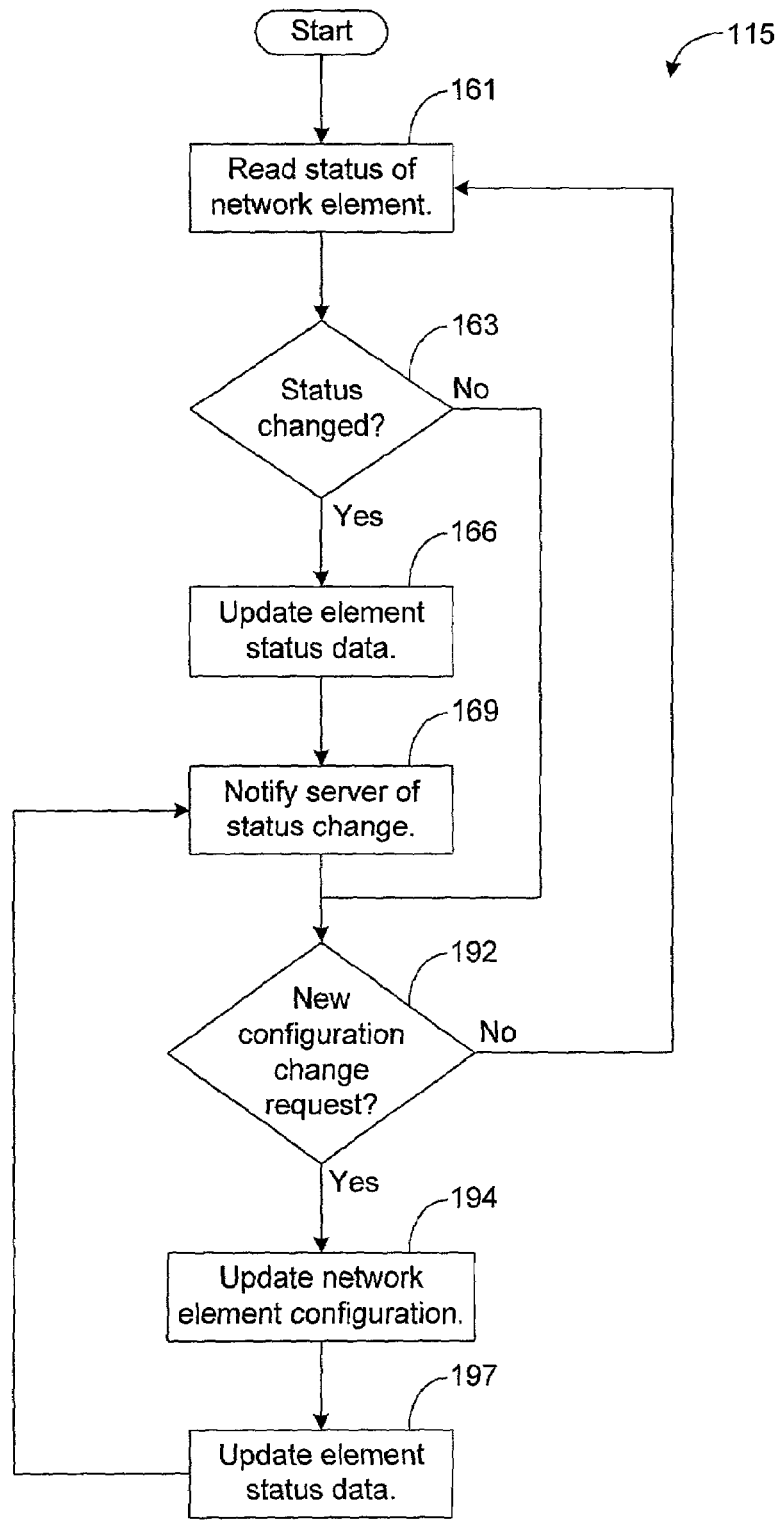
FIG. 9 is a flow chart illustrating a preferred architecture and functionality of a status manager depicted in FIG. 6.

While the user is viewing the original GUI 101, the status manager 115 is periodically checking the status of each element 21 that is of interest to any of the clients 52, as shown by block 161 of FIG. 9. Assume that, when checking the status of the particular element 21, the status manager 115 discovers, in block 163, that a change in the element's status has occurred. This may be achieved by polling the particular element 21 and comparing the polled data with the status data 74. In such a case, the status manager 115 updates, in block 166, the status data 74 for the detected change and then notifies the server 117 of the detected change, as shown by block 169. In response, the server 117 passes, to the communication manager 119, a transmission request for notifying each interested client 52 of the detected change, as shown by blocks 172 and 176 of FIG. 8. In response, the communication manager 119, in block 158 of FIG. 7 and based on the client profile data 105, determines which clients 52 are interested in the particular element 21 and then transmits a message indicative of the occurrence of the detected status change to each such client 52. Each such client 52 then updates its displayed data, as appropriate, to reflect the detected status change.

After viewing the status data 74 of the particular element 21, the user of the user client 52 may decide to change the configuration of the particular element 21 and provide one or more inputs to the user client 52 for doing so. In response, the user client 52 transmits, to the EMS 50, a command or request for changing the configuration of the particular element 21. The communication manager 119 receives the change request and notifies the server 117 of the change request, as shown by blocks 177 and 179 of FIG. 7.

In response, the server 117 instructs the status manager 115 to service the change request, as shown by blocks 184 and 187 of FIG. 8. The status manager 115 then changes the configuration of the particular element 21 according to the change request, as shown by blocks 192 and 194 of FIG. 9. In block 197, the status manger 115 updates the element status data 74 to reflect the configuration change. Once the configuration change is effectuated by the status manager 115, the status manager 115 informs, in block 169, the server 115 that the state or status of the particular element 21 has been changed. Accordingly, the server 117 passes, in block 176 of FIG. 8, a transmission request to the communication manager 119 instructing the manager 119 to inform each client 52 interested in the particular element 21 of the status change. The communication manager 119 then notifies each such client 52 of the status change in block 158 of FIG. 7.

At some point, a user may modify, add, or otherwise update the GUI code 33 at the EMS 50. The server 117 preferably detects such a change in block 201 of FIG. 8. If the change to the GUI code 33 is an update to a set of code 33 previously utilized by the EMS 50, then it is possible that some of the clients 52 are running GUI code 33 that should be updated by the foregoing change. Thus, in such a case, the server 117 preferably passes, to the communication manager 119, a transmission request for notifying such clients 52 of the GUI code change, as shown by block 204. The communication manager 119 then notifies each such client 52 of the change thereby enabling the clients 52 to update their displays based on the aforementioned change to the GUI code 33 of EMS 50. Note that the communication manager 119 may identify each client 52 that should receive the notification based on the client profile data 105. In this regard, each client 52 interested in an element 21 of the type associated with the updated GUI code 33 is preferably notified.

When the user no longer desires to monitor the status of the particular element 21 or to change the configuration of the particular element 21, the user may submit an input, via input device 93 of the user client 52, for closing the original GUI 101. In response, the user client 52 closes the original GUI 101 and discards the GUI code 33 defining the closed GUI 101. The client 52 also transmits, to the EMS 50, a termination message indicating that the user has closed the GUI 101 associated with the particular element 21. As shown by blocks 211 and 214 of FIG. 7, the communication manager 119 receives this message and updates the client profile data 105 to indicate that the client 52 is not interested in the particular element 21.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Now, therefore, the following is claimed:

1. A communication system, comprising:
a plurality of network elements, each of the network elements coupled to a respective subscriber line extending from a field office of a communication network and configured to control communication occurring across said respective subscriber line;
a plurality of clients remotely located from the network elements, the plurality of clients including a first client and a second client; and
an element management system (EMS) remotely located from the network elements and the clients, comprising:
memory for storing sets of graphical user interface (GUI) code, client profile data, and element status data, each set of GUI code associated with a respective network element type, the client profile data indicating which of the network elements are of interest to the clients, the element status data indicating a respective status for each of the plurality of the network elements indicated by the client profile data to be of interest to at least one of the clients; and
a system controller configured to receive a first notification from the first client, the first notification identifying one of the network elements, the system controller configured to determine a network type for the identified network element and to retrieve the set of GUI code associated with the determined network element type in response to the first notification, the system controller configured to transmit the retrieved set of GUI code to the first client in response to the first notification, wherein the retrieved set of GUI code, when run on the first client, causes the first client to display a GUI for displaying information pertaining to the identified network element, the system controller configured to update the client profile data, in response to the first notification, such that the client profile indicates that the first client is interested in the identified network element, the system controller configured to automatically poll, based on the client profile data, each of the network elements indicated to be of interest to at least one of the clients by the client profile data, wherein the system controller, in automatically polling the network elements, is configured to poll the identified network element in response to a determination that the client profile data indicates the identified network element to be of interest to at least one of the clients, the system controller further configured to detect a status change for the identified network element by comparing the element status data to data received from the identified network element via polling, the system controller configured to transmit element update data indicative of the detected status change to the first client in response to a determination by the system controller that the client profile data indicates the identified network element to be of interest to the first client, the system controller further configured to update the element status data in response to the detection of the status change by the system controller.

2. The system of claim 1, wherein the system controller is configured to refrain from polling at least one of the network elements until the client profile data is updated to indicate that at least one of the clients is interested in the at least one network element.

3. The system of claim 1, wherein the first client is configured to transmit a second notification to the EMS in response to a determination that a user has closed the GUI, and wherein the system controller is configured to update the client profile data, in response to the second notification, such that the client profile data no longer indicates the identified network element to be of interest to the first client.

4. The system of claim 1, wherein the system controller is configured to transmit a message to the first client in response to a determination by the system controller that the client profile data indicates the first client to be interested in the identified network element, wherein the system controller is configured to update the client profile data, if the system controller fails to receive a reply to the message within a predefined time period after transmitting the message, such that the client profile data no longer indicates the identified network element to be of interest to the first client.

5. The system of claim 1, wherein the system controller comprises a status manager and a communication manager, the status manager configured to automatically poll, based on the client profile data, each of the network elements indicated to be of interest to at least one of the clients by the client profile data, the communication manager configured to communicate with the clients, to receive the first notification from the first client, and to transmit the element update data to the first client, wherein the status manager and the communication manager are separately and concurrently executed by at least one processing element.

6. The system of claim 5, wherein the status manager is configured to communicate with the network elements via transmission control protocol/internet protocol (TCP/IP) and simple network management protocol (SNMP), and wherein the communication manager comprises a JAVA messaging system (JMS).

7. The system of claim 1, wherein the system controller is configured to consult the client profile data in response to the detection of the status change for determining which of the clients is interested in the identified network element, the system controller further configured to transmit the element update data to the second client in response to the detection of the status change and a determination, based on the client profile data, that the second client is interested in the identified network element.

8. The system of claim 1, wherein the system controller, in response to the first notification, is configured to retrieve a portion of the element status data associated with the identified network element and to transmit the retrieved portion to the first client without polling the identified network element in response to the first notification, the portion indicative of data received from the identified network element via polling prior to the system controller receiving the first notification, wherein the client profile data indicates that the second client is interested in the identified network element.

9. A method for use in a communication system having a plurality of network elements, each of the network elements coupled to a respective subscriber line extending from a field office of a communication network, comprising the steps of:

storing sets of graphical user interface (GUI) code remotely from the network elements and a plurality of clients, the plurality of clients including a first client and a second client;

storing client profile data remotely from the network elements and the clients, the client profile data indicating which of the network elements are of interest to the clients;

storing element status data remotely from the network elements and the clients, the element status data indicating a respective status for each of the plurality of network elements indicated by the client profile data to be of interest to at least one of the clients;

receiving a first notification from the first client, the first notification identifying one of the network elements;

determining a network type for the identified network element;

retrieving, based on the determining step, the set of GUI code associated with the determined network type;

transmitting the retrieved set of GUI code to the first client, wherein the retrieved set of GUI code, when run on the first client, causes the first client to display a GUI for displaying information pertaining to the first client;

updating, in response to the first notification, the client profile data such that the client profile data indicates that the first client is interested in the identified network element;

automatically polling, based on the client profile data, each of the network elements indicated to be of interest to at least one of the clients by the client profile data, wherein the automatically polling step comprises the step of polling the identified network element in response to a determination that the client profile data indicates the identified network element to be of interest to at least one of the clients;

comparing the element status data to data received from the identified network via the polling the identified network element step;

detecting a status change for the identified network element based on the comparing step;

transmitting, to the first client, element update data indicative of the status change in response to the detecting step and in response to a determination that the client profile data indicates the identified network element to be of interest to the first client; and updating the element status data in response to the detecting step.

10. The method of claim 9, further comprising the steps of:

determining that a user of the first client has closed the GUI;

transmitting a second notification from the first client in response to the determining that the user of the first client has closed the GUI step; and updating the client profile data, in response to the second notification, such that the client profile data no longer indicates the identified network element to be of interest to the first client.

11. The method of claim 9, further comprising the steps of:

transmitting a message to the first client in response to a determination that the client profile data indicates the first client to be interested in the identified network element;

determining whether a reply to the message is received within a predefined time period after the transmitting the message step; and updating the client profile data, if the reply is not received within the predefined time period, such that the client profile data no longer indicates the identified network element to be of interest to the first client.

12. The method of claim 9, further comprising the steps of:

consulting the client profile data in response to the detecting step;

determining which of the clients is interested in the identified network element based on the consulting step; and transmitting the element update data to the second client in response to the detecting step if the client profile data indicates that the second client is interested in the identified network element.

13. The method of claim 9, further comprising the steps of:

retrieving, in response to the first notification, a portion of the element status data associated with the identified network element; and transmitting the retrieved portion to the first client without polling the identified network element in response to the first notification, wherein the portion is indicative of data received from the identified network element via polling prior to the receiving the first notification step, wherein the client profile data indicates that the second client is interested in the identified network element.

\* \* \* \* \*

UNITED STATES PATENT AND TRADEMARK OFFICE
CERTIFICATE OF CORRECTION

PATENT NO.       : 7,363,360 B2
APPLICATION NO.  : 10/068313
DATED            : April 22, 2008
INVENTOR(S)      : Miller, II et al.

It is certified that error appears in the above-identified patent and that said Letters Patent is hereby corrected as shown below:

Title page, item [73] the Assignee: "ADIRAN, Inc." should be changed to --ADTRAN, Inc.--

Signed and Sealed this
Fifth Day of April, 2011

David J. Kappos
*Director of the United States Patent and Trademark Office*